United States Patent [19]
Savoie

[11] Patent Number: 5,678,967
[45] Date of Patent: Oct. 21, 1997

[54] APPARATUS FOR CUTTING A WORKPIECE AND INCLUDING A KINEMATIC TOOL COUPLING

[75] Inventor: Marc Y. Savoie, Moncton, Canada

[73] Assignee: Micro Optics Design Corporation, Moncton, Canada

[21] Appl. No.: 561,404

[22] Filed: Nov. 21, 1995

[51] Int. Cl.[6] ............................. B23C 3/00; B23B 31/02
[52] U.S. Cl. ..................... 409/233; 279/133; 409/144; 409/230; 409/232; 451/548
[58] Field of Search ..................... 451/548; 409/144, 409/230, 232, 233, 133; 279/133

[56] References Cited

U.S. PATENT DOCUMENTS

| | | | |
|---|---|---|---|
| 2,799,980 | 7/1957 | Keeleric | 451/548 |
| 3,586,343 | 6/1971 | Reed | 409/232 |
| 3,716,951 | 2/1973 | Walters | 451/548 |
| 3,851,562 | 12/1974 | Tomita et al. | 20/11 A |
| 4,175,898 | 11/1979 | Wood | 409/233 |
| 4,254,554 | 3/1981 | Germano et al. | 33/174 L |
| 4,412,764 | 11/1983 | Wawrzyniak | 408/226 |
| 4,607,989 | 8/1986 | Kitamura | 409/232 |
| 4,642,005 | 2/1987 | Kondo et al. | 409/232 |
| 4,649,623 | 3/1987 | Schneider et al. | 483/69 |
| 4,718,798 | 1/1988 | Dumargue et al. | 409/97 |
| 4,789,273 | 12/1988 | Wiacek et al. | 407/34 |
| 4,976,019 | 12/1990 | Kitamura | 409/133 |
| 4,979,284 | 12/1990 | McMurtry et al. | 483/1 |
| 5,052,153 | 10/1991 | Wiand | 451/548 |
| 5,092,083 | 3/1992 | Raffaelli | 451/548 |
| 5,140,782 | 8/1992 | Mecteau et al. | 451/42 |
| 5,226,869 | 7/1993 | Thumm | 483/1 |
| 5,342,155 | 8/1994 | Harroun | 409/233 |
| 5,446,970 | 9/1995 | McMurty et al. | 33/572 |

FOREIGN PATENT DOCUMENTS

| | | | |
|---|---|---|---|
| 58-114843 | 7/1983 | Japan | 364/474.17 |

OTHER PUBLICATIONS

Precision Machine Design by A. H. Slocum, Prentiss Hall, 1992, pp. 401–404.

*Primary Examiner*—Daniel W. Howell
*Assistant Examiner*—Christopher Kirkman
*Attorney, Agent, or Firm*—Thomas R. Lampe

[57] ABSTRACT

Apparatus for cutting a workpiece includes a rotatable cutting tool, a rotatable spindle for rotating the cutting tool, and a quick-connect and disconnect kinematic coupler for releasably coupling together the rotatable cutting tool and the rotatable spindle. The kinematic coupler includes a plurality of projections which cooperate with and enter a corresponding number of grooves to precisely place the cutting tool relative to the spindle and prevent relative movement between the cutting tool and the spindle.

13 Claims, 5 Drawing Sheets

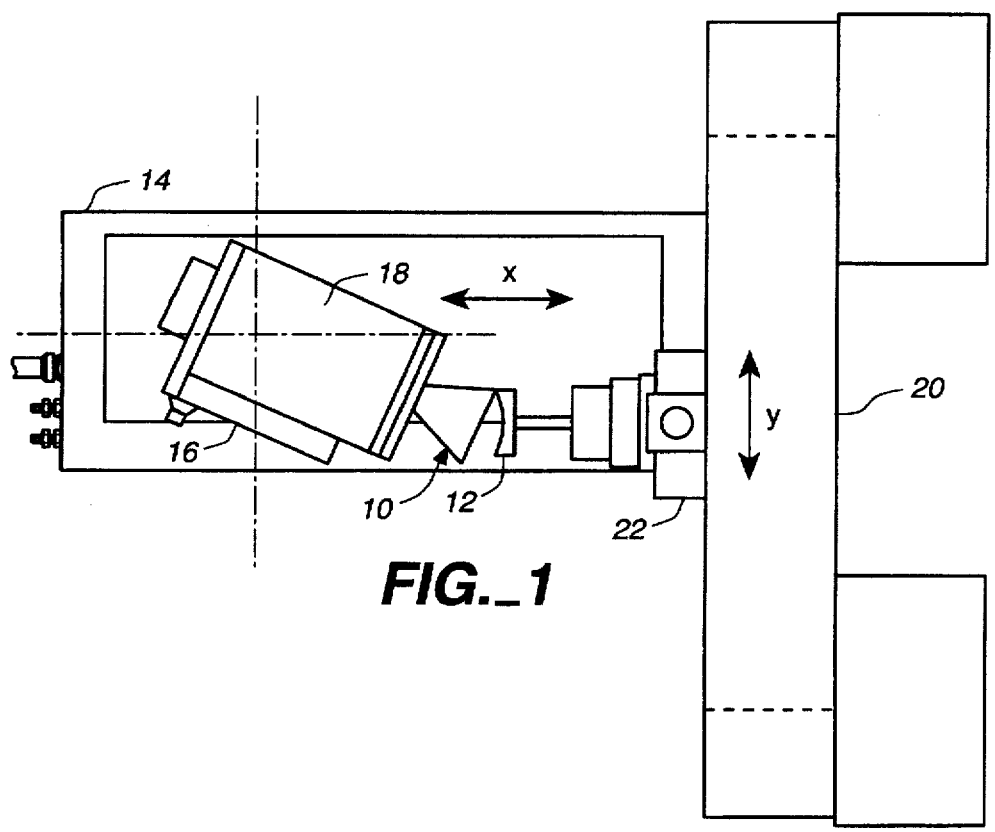
FIG._1
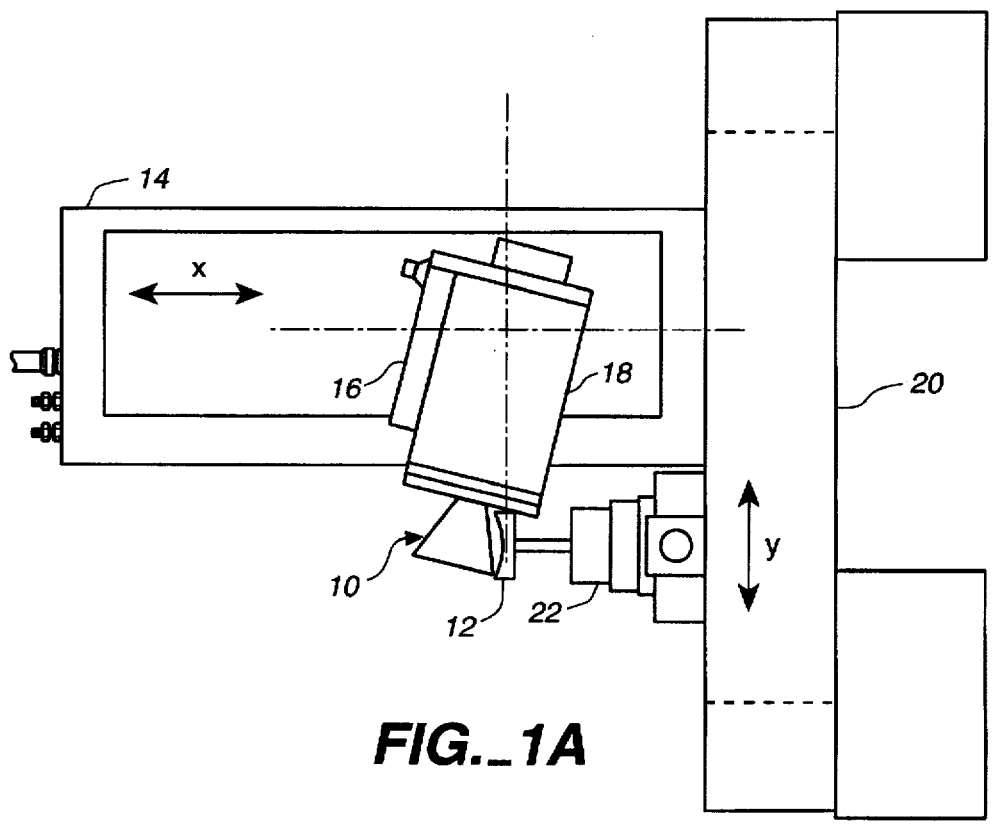
FIG._1A

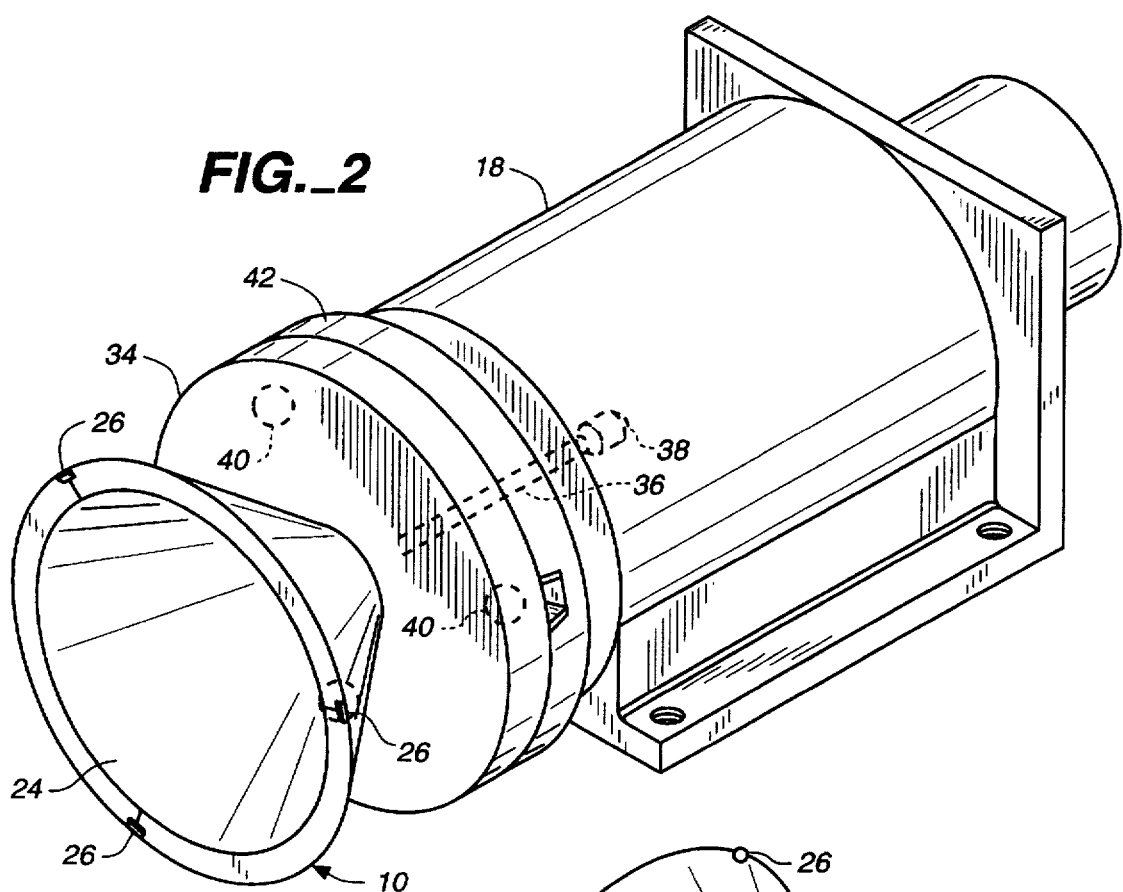
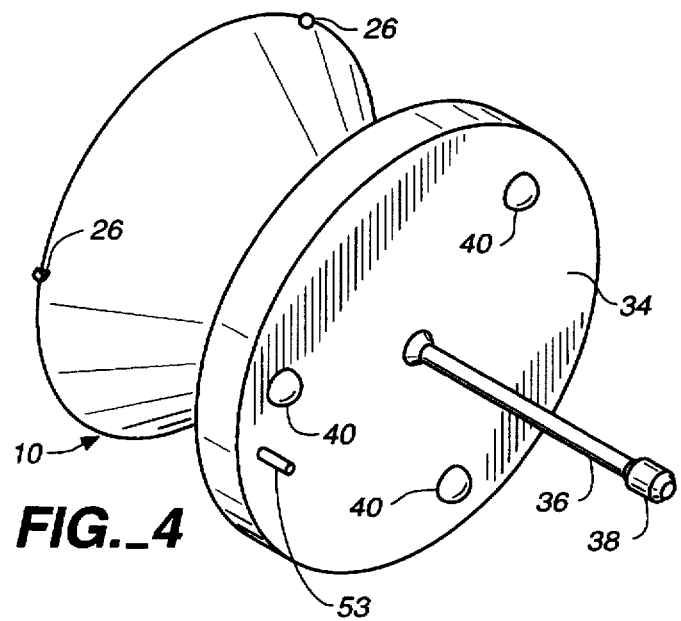
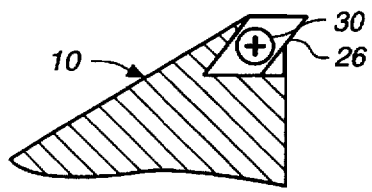
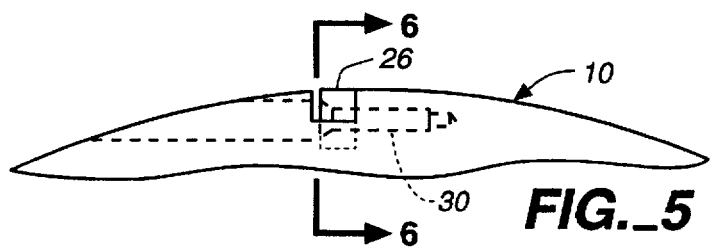

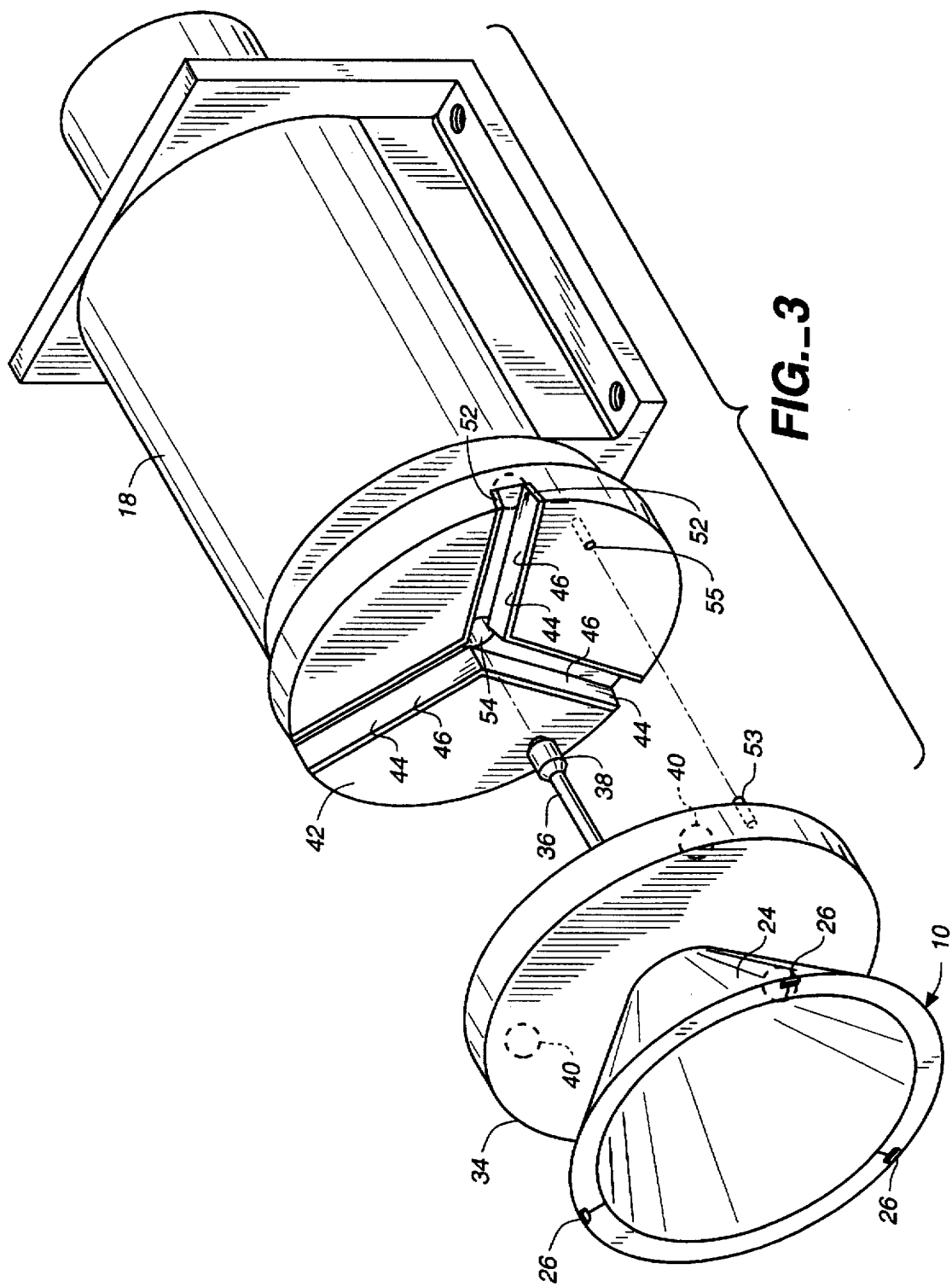
FIG._3

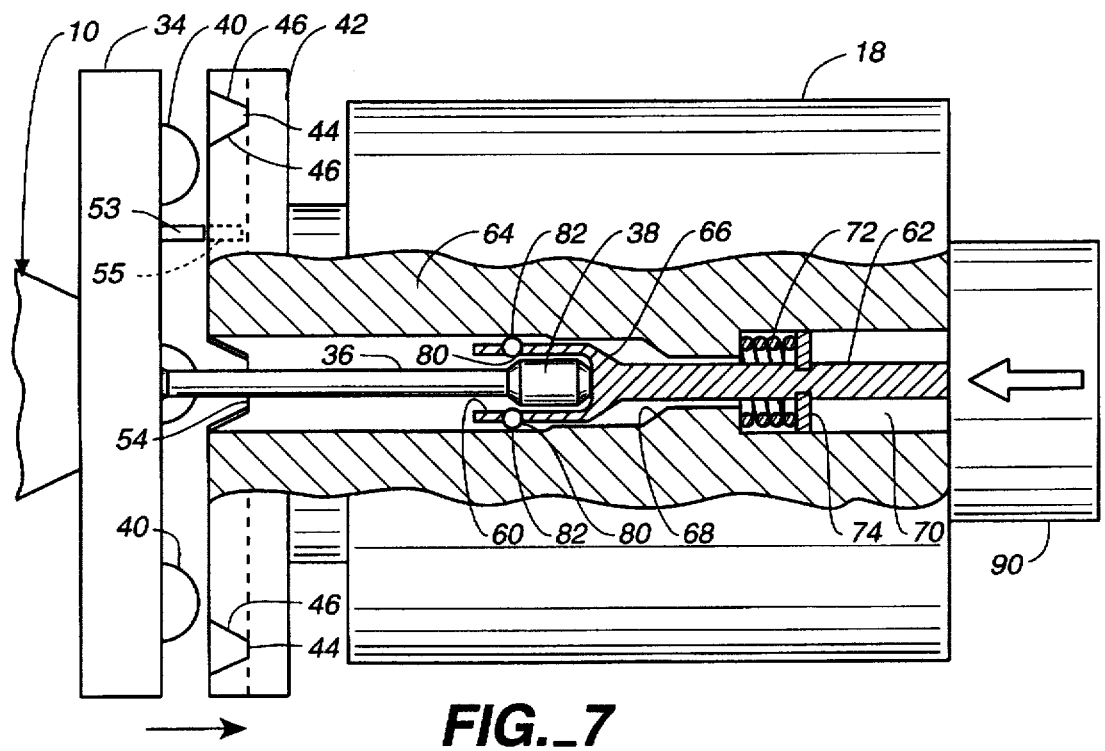
FIG._7
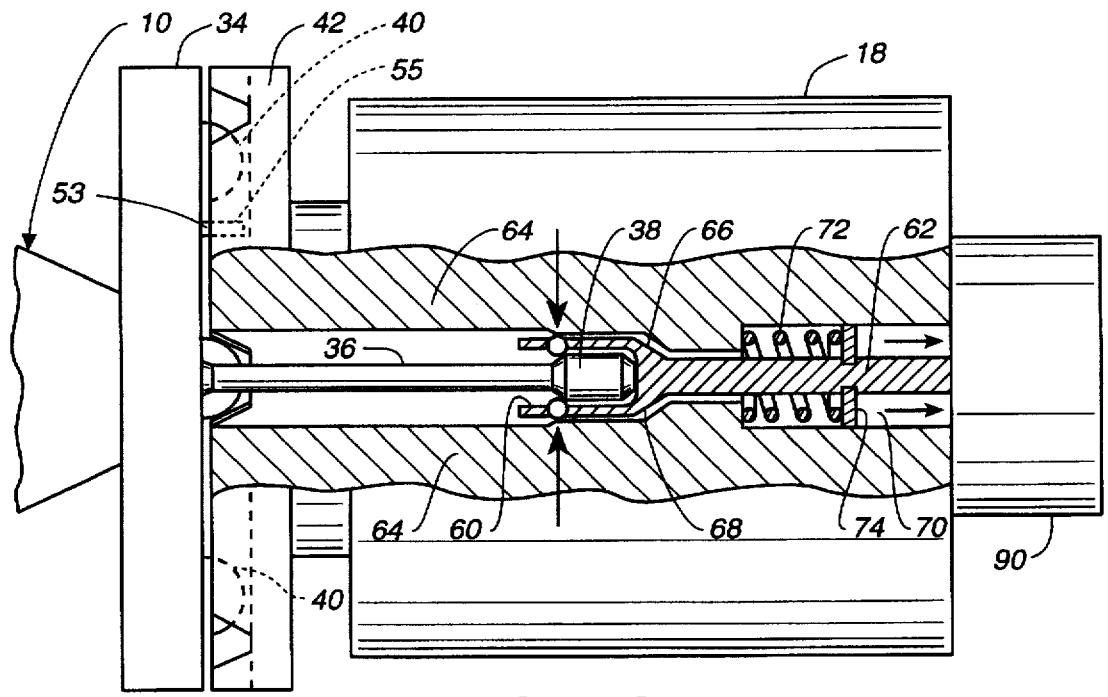
FIG._7A

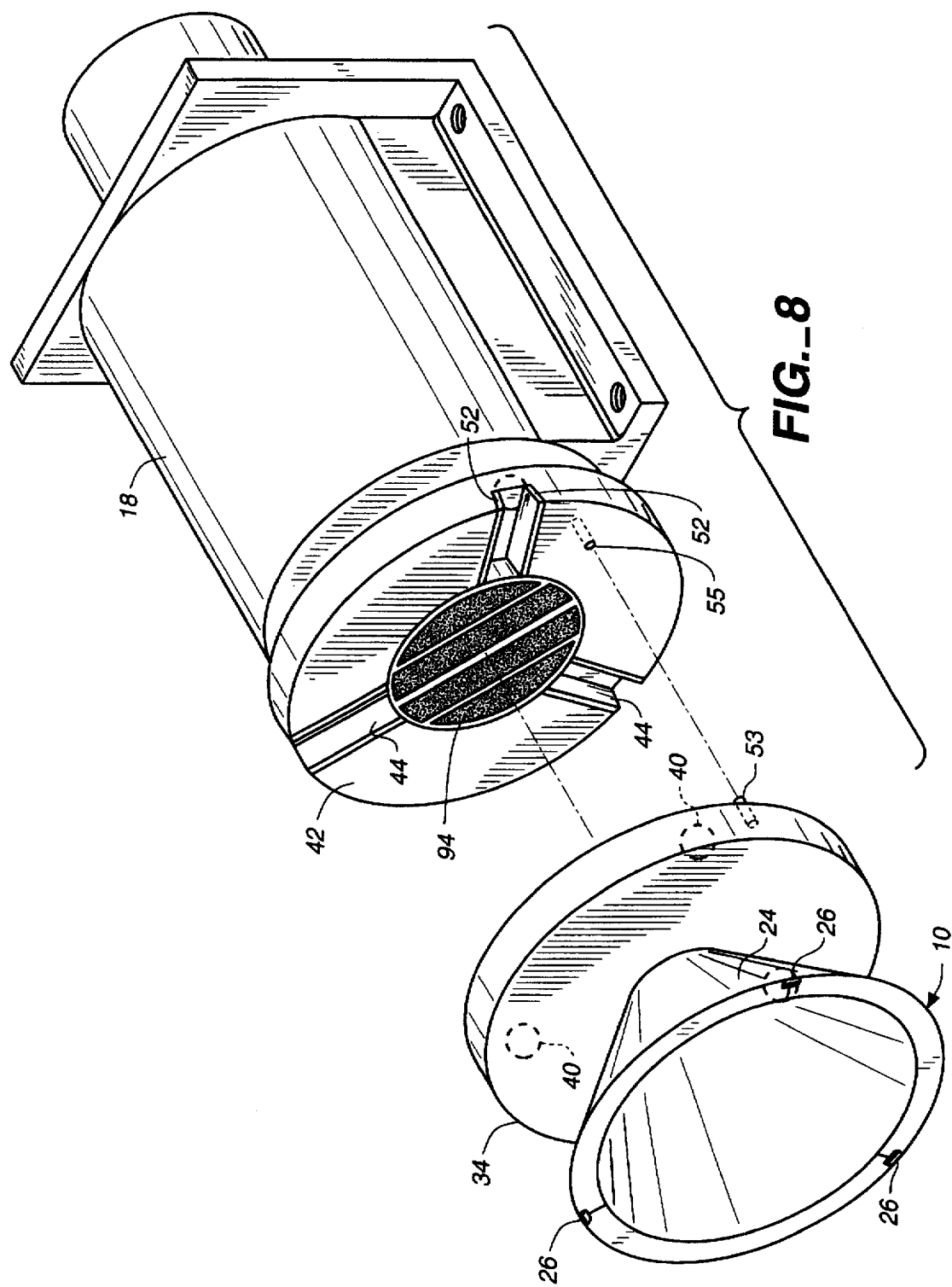
FIG._8

_5,678,967_

APPARATUS FOR CUTTING A WORKPIECE AND INCLUDING A KINEMATIC TOOL COUPLING

TECHNICAL FIELD

This invention relates to apparatus for cutting a workpiece, and more particularly to apparatus employing a rotatable cutting tool which can be quickly coupled to or decoupled from cutting tool rotating means such as a rotatable spindle by a kinematic coupling. The disclosed apparatus has particular application to the generation of ophthalmic lens curvatures.

BACKGROUND ART

It is well known to generate ophthalmic lens curvatures through use of a toric or "cup wheel" tool or generator. The traditional toric generator cuts a curve which is only an approximation of the final lap curvature, this approximate curvature being attained by moving the tool about a pivot point relative to the lens during the generation process. The pivot point is located at the center of the base curve. A second pivot point located under the tool's cutting edge is used to adjust the angle of the tool relative to the lens surface prior to the generating process. Separate lapping steps, including fining (or smoothing) and polishing, must be carried out in most instances to remove these unwanted errors of curvature and surface roughness from the lens, and thus create a perfect (or near perfect) toric and transparent lens.

A more recent development in generator technology has been the three axis generator wherein the tool (typically a single point diamond cutter or a ball end mill type cutter) and the lens are relatively moved in three axes. To date three axes generators have not proven capable of cutting lenses to the high degree of accuracy sufficient to eliminate surface curvature (figure) errors at an acceptable cutting speed.

It is desirable to incorporate and combine the advantages of the three axes single point diamond cutter or milling type generator with those of the cup wheel style generator. However, a desirable feature of such an approach would be the ability to quickly and accurately replace the lens cutting tool in the generator apparatus. The present invention relates to apparatus allowing for the quick coupling or decoupling of a rotatable lens cutting tool whereby cutting tools of different diameters may be employed to generate a final lens surface, thus avoiding conventional fining and polishing operations. Rotation of the tool must be at an extremely low level of vibration to achieve this level of surface finish.

Although the invention as described herein has particular application to generation of ophthalmic lenses, the principles of the invention also have application to other types of rotating tools wherein a high degree of accuracy in the placement and operation of the tool is required with minimal vibration.

A search directed to this invention located the following United States patents: U.S. Pat. No. 4,979,284, issued Dec. 25, 1990, U.S. Pat. No. 5,226,869, issued Jul. 13, 1993, U.S. Pat. No. 4,175,898, issued Nov. 27, 1979, U.S. Pat. No. 5,140,782, issued Aug. 25, 1992, U.S. Pat. No. 4,718,798, issued Jan. 12, 1988, U.S. Pat. No. 4,642,005, issued Feb. 10, 1987, U.S. Pat. No. 4,607,989, issued Aug. 26, 1986, U.S. Pat. No. 3,716,951, issued Feb. 20, 1973, and U.S. Pat. No. 3,586,343, issued June 22, 1971.

Kinematic coupling design principles are generally discussed in pages 401–404 in Precision Machine Design by A. H. Slocum, Prentice Hall, 1992.

DISCLOSURE OF INVENTION

The present invention relates to apparatus which provides for the efficient and accurate replacement of rotatable cutting tools such as lens cutting tools in a lens generator. The apparatus includes a rotatable cutting tool having at least one cutting element for engaging and cutting a workpiece, such as a lens, upon rotation of the rotatable cutting tool about a cutting tool axis of rotation. The at least one cutting element is spaced from the cutting tool axis of rotation and follows a circular path of movement upon rotation of the rotatable cutting tool.

Cutting tool rotating means is provided for rotating the rotatable cutting tool and includes a rotatable element having a rotatable element axis of rotation.

The apparatus also includes quick-connect and disconnect kinematic coupling means for releasably coupling together the rotatable lens cutting tool and the cutting tool rotating means with the cutting tool axis of rotation and the rotatable axis of rotation coincident.

The cutting tool rotating means includes a motor and the rotatable element comprises a spindle rotatable about said rotatable element axis of rotation. The quick-connect and disconnect kinematic coupling means includes tool centering means for centering the rotatable cutting tool relative to the spindle whereby the rotatable element axis of rotation and the cutting tool axis of rotation are coincident.

The quick-connect and disconnect kinematic coupling means includes a cutting tool base member affixed to the rotatable cutting tool at a location spaced from said at least one cutting element.

The tool centering means includes a plurality of radially extending, outwardly diverging grooves formed in one of either the cutting tool base member or the spindle and a plurality of projections projecting outwardly from the other of the cutting tool base member or the spindle for seating in the grooves.

The projections and the grooves are cooperable to maintain the cutting tool axis of rotation coincident with the rotatable element axis of rotation and to prevent relative rotation between the rotatable cutting tool and the spindle.

Other features, advantages, and objects of the present invention will become apparent with reference to the following description and accompanying drawings.

BRIEF DESCRIPTION OF DRAWINGS

FIG. 1 is a diagrammatic plan view of a lens generator incorporating the teachings of the present invention;

FIG. 1A is a view similar to FIG. 1 with the structural elements thereof in different relative positions;

FIG. 2 is a perspective view of selected structural components of the invention including a rotatable lens cutting tool mounted on a motor for rotating the tool;

FIG. 3 is a perspective view of decoupled structural components of FIG. 2;

FIG. 4 is a perspective rear view of the tool, tool base member and related components;

FIG. 5 is an enlarged elevational view of a portion of the tool of FIG. 4 illustrating structural details, including a cutter insert;

FIG. 6 is a greatly enlarged, cross-sectional view taken along line 6—6 of FIG. 5;

FIG. 7 is a partial sectional side view illustrating the cutting tool base member being brought into engagement with a motor element;

FIG. 7A is a view similar to FIG. 7 showing the tool base member fixed in place relative to the motor; and FIG. 8 is a view similar to FIG. 3 but illustrating an alternative embodiment of the invention.

MODES FOR CARRYING OUT THE INVENTION

FIGS. 1 and 1A illustrate in diagrammatic fashion apparatus constructed in accordance with the teachings of the present invention, the components thereof having different relative positions in these figures.

The apparatus illustrated in FIGS. 1 and 1A in diagrammatic fashion is a multi-axis lens generator. More particularly, the apparatus is for establishing relative movement between a rotatable lens cutting tool 10 and a lens 12. The purpose of the apparatus is to generate a curved lens surface with a high degree of precision, avoiding the requirement of lapping the lens as is commonly the case with prior art arrangements. More specifically, the apparatus is for the purpose of generating ophthalmic lens curvatures and to provide an optically accurate curve that once cut is also optically transparent or can easily be made transparent through the application of a transparent coating. To accomplish this, vibration of the cutting tool must be held to a minimum.

The illustrated lens generator includes a first table 14 linearly movable in the X direction. A second table 16 is rotatably mounted on first table 14. Cutting tool rotating means in the form of electric motor 18 for rotating tool 10 is affixed to and rotatable with second table 16.

A third table 20 is movable in the Y direction, the third table 20 supporting a lens holder 22. The lens holder is linearly movable in the Z direction (toward the reader) orthogonally with respect to the X and Y directions on the third table 20.

The arrangement shown in FIG. 1 is a four-axis lens curve generator, the generator resulting in controlled relative movement between the cutting tool 10 and the lens 12 which will enable a precise cut of the lens to be accomplished.

The rotatable lens cutting tool is one of a plurality of such tools which are alternatively employed to provide the desired lens cut. The cutting tools (other than tool 10) are not illustrated and have different diameters, and to efficiently and expeditiously carry out the cutting process it is necessary that the cutting tools be connected to the cutting tool rotating means by a mechanism which will provide for quick and accurate tool change. The present invention incorporates quick-connect and disconnect kinematic coupling means for accomplishing this objective.

Referring now to FIGS. 2–4 and 5–7A, rotatable lens cutting tool 10 is shown in detail. More specifically, tool 10 is generally of the "cup wheel" type, including a tool body 24 having the general appearance of a truncated cone. The tool body is formed of any suitable material such as stainless steel or carbon steel. Located at the round open distal end of the tool body 24 are lens cutting elements in the form of removable cutter inserts 26 having diamond cutting tips. The cutter inserts are disposed in notches formed in the tool body, the notches and inserts being 120 degrees apart in the illustrated embodiment. Screw fasteners 30 (FIGS. 5 and 6) are utilized to secure the cutter inserts to the tool body.

It will be appreciated that the cutter inserts are co-planar and will define a circular path in a common plane upon rotation of the tool. One suitable commercially available insert is the T-MAX V, VCMW-F diamond tipped insert made available by Sandvik Corporation, having a location of business at Fair Lawn, New Jersey.

Affixed to the small end of tool body 24 is a cutting tool base member 34 which is in the form of a circular plate. Cutting tool base member 34 may be constructed of any suitable material such as stainless steel or carbon steel. A mechanical interference fit or any other suitable expedient, such as welding, may be utilized to effect attachment between the tool body and the cutting tool base member.

Projecting from the center of cutting tool base member 34 on the side thereof opposed to tool body 24 is a tension rod 36 constructed of high tensile strength steel or other suitable material. The tension rod has some degree of flexibility. An enlargement or knob 38 is located at the distal end of the flexible rod. Rod 36 has a longitudinal axis coincident with the lens cutting tool axis of rotation.

Also comprising part of the kinematic coupling are projections 40 secured to cutting tool base member 34 and projecting outwardly from the surface or side thereof in opposition to the lens cutting tool. The projections 40 have curved outer projection surfaces defining segments of a sphere. The projections 40 are of identical construction and are disposed at approximately 120 degree increments at locations spaced outwardly from the tension rod 36. The generally hemispherical projections 40 may be of constructed of any suitable material, examples being silicon nitride or steel, and are secured in place by any suitable expedient such as epoxy adhesive.

The cutting tool rotating means in the form of electric motor 18 includes a rotatable spindle 42 including an armature plate having a circular-shaped outer periphery. Three radially extending, outwardly diverging grooves or channels 44 are formed in the spindle plate, the front face of the plate being otherwise flat. The grooves 44 are defined by spaced, outwardly diverging side walls 46. Grooves 44 are of identical configuration and are arrayed approximately 120 degrees apart. Spindle 42 is preferably made of steel and side walls 46 are surfaced by a ceramic layer, such as silicon nitride, bonded to the rest of the spindle. The layer of ceramic material is designated in FIG. 3 by reference numeral 52.

A hole 54 is formed at the center of spindle 42 which receives the distal end of tension rod 36 when the rotatable lens cutting tool is being operatively connected to the cutting tool rotating means. See FIG. 7. Tension will be exerted on the distal end of the tension rod 36 to maintain it under tension when the projections 40 are located in the grooves 44 as shown in FIG. 7A. As can be seen in FIG. 7A, the projections do not bottom out in the grooves. Rather, they are in engagement with the groove side walls 46 at a location outwardly of the groove bottoms sufficient to maintain the projections out of engagement with the groove bottoms. This cooperation between the projections and grooves will maintain the lens cutting tool axis of rotation coincident with the spindle element axis of rotation and also prevent relative rotation between the rotatable lens cutting tool and the motor element. The flexibility of the tension rod allows precise placement of the lens cutting tool relative to the spindle. Precise placement of the tool in such manner minimizes vibration during rotation.

In order for proper balance and rotational stability of the tool to be maintained, it is necessary that any given projection always seats in the same groove. To ensure that this occurs, an index pin 53 projecting from cutting tool base member 34 must align with and enter over sized hole 55 in the spindle.

When the projections are in engagement with the groove side walls 46, the distal end of the tension rod 36 having the enlargement 38 thereon is positioned in a recess 60 (FIGS. 7 and 7A) formed at the end of a draw bar 62, the draw bar itself being telescopically mounted within the interior 64 of spindle 42. Adjacent to recess 60 draw bar 62 has a tapered surface 66. This taper generally conforms to a tapered segment 68 defined by the inner interior wall of spindle 42.

The spindle interior includes an enlarged interior segment 70 at a location spaced from the tapered segment 68. Located within enlarged interior segment 70 is a coil compression spring 72.

Coil compression spring 72 bears at one end thereof against the spindle and at the other end thereof against a flange 74 affixed to draw bar 62. That is, coil compression spring 72 continuously biases or urges the draw bar 62 toward the right as viewed in FIGS. 7 and 7A.

A plurality of openings are formed in the side wall of the draw bar 62 defining recess 60. These openings 80 accommodate therein movable lock balls 82 which are forced inwardly into the recess 60 by the spindle inner wall as tapered surface 66 approaches tapered segment 68 of the spindle interior wall. This inward projection (shown by the bold arrows in FIG. 7A) causes the lock balls to bear against enlargement 38 and thus prevent its removal from the recess 60. Of course, the compression spring 72 results in this being the normal condition. The spring 72 will also serve to exert a continuous tensile force on tension rod 36. Openings 80 are somewhat restricted so that the lock balls cannot completely enter recess 60.

By exerting a sufficient force on the draw bar 62 to move it to the left as viewed in FIGS. 7 and 7A, the lock balls will disengage from the tapered segment of the housing and can readily be displaced outwardly. Thus, the operator can readily remove the tool 10, cutting tool base member 34, and tension rod 36 from operative association with the motor and replace it with another. The other tool will, of course, be associated with a cutting tool base member and tension rod of like construction so that ready and exact interchange is allowed.

Inward displacement of the draw bar 62 can be effected by any desired expedient. For example, this inward displacement may be effected manually. Alternatively, a mechanism such as a air or hydraulic cylinder 90 may be utilized for such purpose.

FIG. 8 illustrates an alternative embodiment of the invention wherein an electromagnet 94 is utilized to secure the tool base member and tool 10 supported thereby to the spindle 42. In this embodiment, the tool plate is constructed of a magnetically attractive material, for example carbon steel. Any suitable conventional arrangement, e.g. slip rings (not shown), may be utilized to energize the electromagnet.

I claim:

1. Apparatus for cutting an ophthalmic lens said apparatus comprising, in combination:

a rotatable lens cutting tool having at least one cutting element for engaging and cutting a lens upon rotation of said rotatable lens cutting tool about a lens cutting tool axis of rotation, said at least one cutting element being spaced from said lens cutting tool axis of rotation and following a circular path of movement upon rotation of said rotatable lens cutting tool;

lens cutting tool rotating means for rotating said rotatable lens cutting tool and including a rotatable element having a rotatable element axis of rotation; and quick-connect and disconnect kinematic coupling means for releasably coupling together said rotatable lens cutting tool and said lens cutting tool rotating means with said lens cutting tool axis of rotation and said rotatable element axis of rotation coincident, said lens cutting tool rotating means including a motor and said rotatable element comprising a spindle rotatable about said rotatable element axis of rotation said quick-connect and disconnect kinematic coupling means including lens cutting tool centering means for centering said rotatable lens cutting tool relative to said spindle whereby the rotatable element axis of rotation and the lens cutting tool axis of rotation are coincident, said quick-connect and disconnect kinematic coupling means including a lens cutting tool base member affixed to said rotatable lens cutting tool at a location spaced from said at least one cutting element and said lens cutting tool centering means including three radially extending, outwardly diverging grooves formed in one of either said lens cutting tool base member or said spindle and a plurality of projections projecting outwardly from the other of said lens cutting tool base member or said spindle for seating in said grooves with at least one projection in each groove, said projections and said grooves cooperable to maintain the lens cutting tool axis of rotation coincident with the rotatable element axis of rotation and to prevent relative rotation between said rotatable lens cutting tool and said spindle, said grooves being defined by spaced, outwardly diverging non-convex side walls and each of said projections having a curved outer projection surface defining a segment of a sphere engageable with said spaced, outwardly diverging non-convex side walls, said quick-connect and disconnect kinematic coupling means additionally including a tension rod for connection to said spindle projecting from said lens cutting tool base member on a side of said lens cutting tool base member opposed to said rotatable lens cutting tool, said tension rod having a tension rod distal end spaced from said lens cutting tool base member and having a longitudinal axis substantially coincident with said lens cutting tool axis of rotation when said rotatable lens cutting tool is coupled with said lens cutting tool rotating means by said quick-connect and disconnect kinematic coupling means, said tension rod being rigid in the direction of the longitudinal axis thereof and radially compliant when force is applied thereto to allow relative movement between said tension rod distal end and said lens cutting tool base member.

2. The apparatus according to claim 1 wherein said quick-connect and disconnect kinematic coupling means additionally includes tensioner means operatively associated with said spindle for releasably engaging the distal end of said tension rod and applying pulling forces on said tension rod in a direction away from said rotatable lens cutting tool to maintain said tension rod under tension when said rotatable lens cutting tool is coupled with said lens cutting tool rotating means by said quick-connect and disconnect kinematic coupling means.

3. The apparatus according to claim 1 wherein said tension rod comprises an elongated flexible rod having a distal end.

4. The apparatus according to claim 3 wherein said flexible rod has an enlargement at the distal end thereof, said tensioner means engageable with said enlargement to maintain said flexible rod under tension when said rotatable lens cutting tool is coupled with said lens cutting tool rotating means by said quick-connect and disconnect kinematic means.

5. The apparatus according to claim 4 additionally including lock means for selectively locking said tensioner means in engagement with said enlargement.

6. The apparatus according to claim 5 wherein said tensioner means includes a draw bar defining a recess for receiving said enlargement and wherein said lock means includes at least one movable lock member engageable with said enlargement to retain said enlargement in said recess.

7. The apparatus according to claim 6 wherein said spindle includes an inner surface defining a spindle interior telescopically receiving said draw bar and said flexible rod, said spindle inner surface for engagement by said at least one movable lock member to urge said at least one movable lock member toward said flexible rod and said flexible rod projecting from said spindle interior and being spaced from said spindle inner surface between the distal end and said lens cutting tool base member to allow flexing of said flexible rod.

8. The apparatus according to claim 7 wherein said tensioner means additionally includes biasing means for biasing said draw bar relative to said spindle toward a position in which said at least one movable lock member engages the spindle inner surface, said biasing means maintaining said tension ord under tension.

9. The apparatus according to claim 1 wherein said rotatable lens cutting tool includes a plurality of cutting elements, said plurality of cutting elements being spaced from one another and generally co-planar.

10. The apparatus according to claim 9 wherein said cutting elements comprise removable cutter inserts, said apparatus including fastener means for securing said removable cutter inserts to the remainder of said rotatable lens cutting tool.

11. The apparatus according to claim 10 wherein said inserts include diamond cutter tips.

12. The apparatus according to claim 1 wherein said projections are of substantially identical configuration.

13. The apparatus according to claim 1 wherein said spaced, outwardly diverging side walls are at least partially comprised of ceramic material.

* * * * *